UNITED STATES PATENT OFFICE.

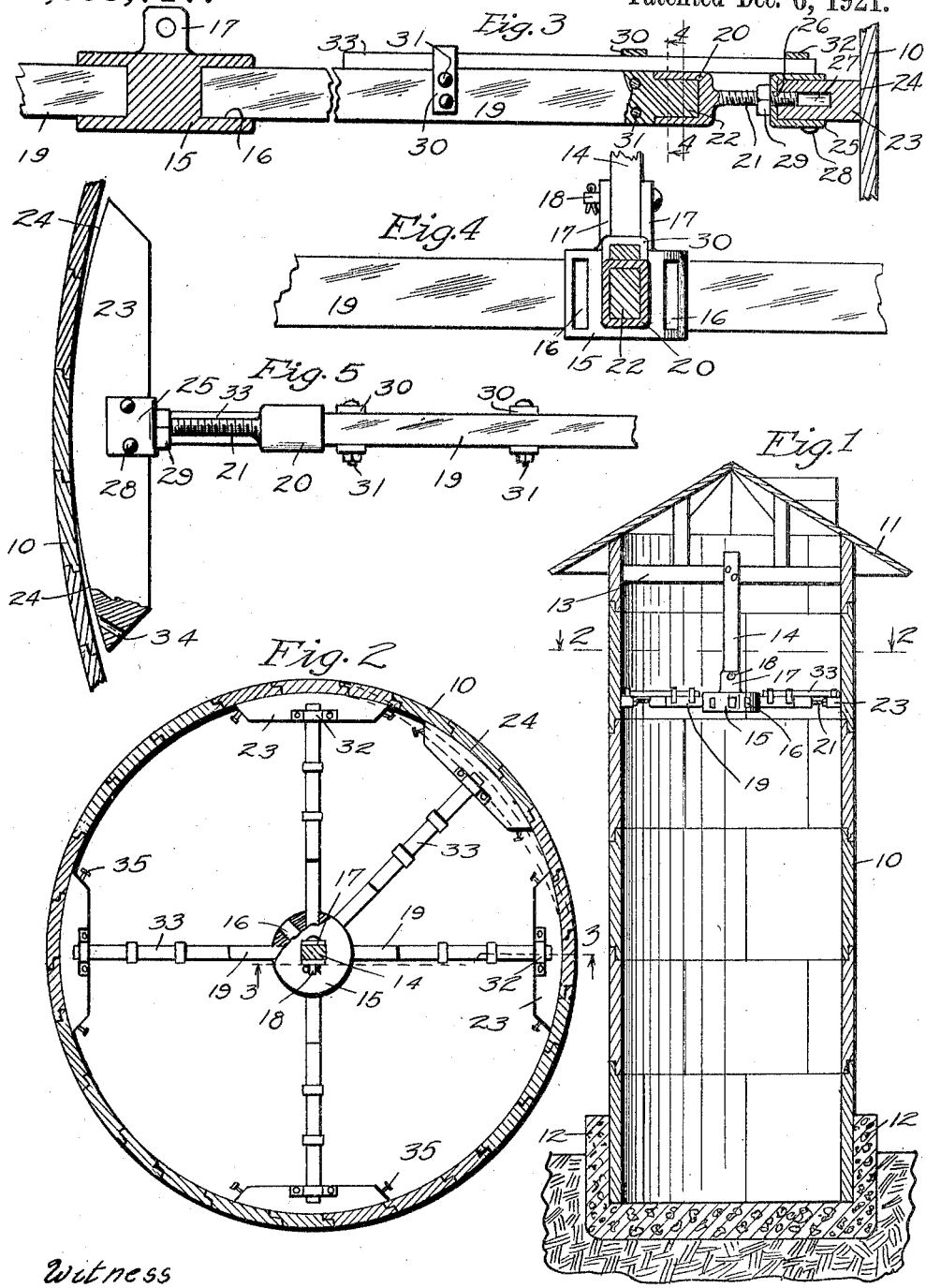

JOSEPH A. DREW, OF CASCADE, IOWA.

SILO-TRUING DEVICE.

1,399,717.  Specification of Letters Patent.  Patented Dec. 6, 1921.

Application filed September 20, 1920. Serial No. 411,572.

*To all whom it may concern:*

Be it known that I, JOSEPH A. DREW, a citizen of the United States, and a resident of Cascade, in the county of Dubuque and State of Iowa, have invented a certain new and useful Silo-Truing Device, of which the following is a specification.

The object of my invention is to provide a silo truing device of simple, durable and inexpensive construction, and so arranged that it may readily and easily be installed in a silo.

More particularly my invention relates to a device for truing silos preferably made of wood.

It will be understood that due to imperfections in the construction of a silo and due to climatic conditions, and due to the fact that a silo remains empty for a portion of the season, which is usually the hottest and dryest months of the year, the silo expands in parts and contracts in other parts, which causes the silo to become untrue and the walls to become diagonal or slanting rather than perpendicular.

My invention provides an easy means for replacing the silo in its true original position, and at the same time forms a means for holding the silo in its true position when the silo is empty.

A further object is to provide in such a device, suitable arms extending radially outwardly from a common center, and adjustable means whereby the arms may be moved outwardly to various positions until the silo forms a true circle.

Still a further object is to provide in such a device, means for forcing the silo walls outwardly and for holding them in their outward position, the parts being so arranged that they may be used upon one portion of a silo wall without substantially affecting the remainder of the silo.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a central, sectional view taken through a silo with my improved truing device installed therein.

Fig. 2 is a horizontal, sectional view taken on the line 2—2 of Fig. 1, showing a top view of my truing device.

Fig. 3 is a sectional view taken on the line 3—3 of Fig. 2.

Fig. 4 is a vertical, central, sectional view taken on the line 4—4 of Fig. 3; and Fig. 5 is a detail view of a portion of one of the arms and the wall engaging member.

In the accompanying drawings, I have used the reference numeral 10 to indicate an ordinary silo, which is preferably made of wood and provided with the roof 11. The silo 10 is set in a concrete base or foundation 12.

The silo 10 is provided near its upper end with a joist 13, to which is fixed the downwardly extending arm 14, the purpose of which will be hereinafter more fully set forth.

My improved silo truing device comprises a center member 15, which is provided with a plurality of sockets 16. The center member 15 is provided on its upper surface with a pair of upwardly extending ears 17, which are provided with openings through which is extended a pin 18.

The spaced ears 17 are received on opposite sides of the downwardly extending arm 14, and the pin 18 is extended through an opening in the arm 14, which registers with the openings in the ears 17.

From the construction of the parts just described, it will be seen that the center member 15 is suspended within the silo by means of the arm 14. Received within the sockets 16 and extending radially outwardly therefrom are the arms 19. The arms 19 are provided at their outer ends with hub members 20, which are provided with a forwardly extending screw-threaded projection 21.

The outer ends of the arms 19 are provided with a tongue 22, which is received within the hub member 20, substantially as illustrated in Fig. 3 of the drawings.

Silo wall engaging members 23 are provided, which have surfaces 24, which are formed on the arc of a circle.

Each of the wall engaging members 23 is provided with a U-shaped member 25, which is provided with an opening 26. An opening 27 is provided within the silo wall engaging members 23, which registers with the opening 26 of the U-shaped member 25. The U-shaped member 25 is fixed to the wall engaging members 23 by means of the rivets or bolts 28.

The free end of the screw-threaded projection 21 extends through the opening 26 and into the opening 27, substantially as is illustrated in Fig. 3 of the drawings. A nut 29 is provided on the screw-threaded projection 21 and is designed to rest against one side of the U-shaped member 25, whereby the rotation of the nut 29 will cause the silo wall engaging member 23 to be moved outwardly against the silo wall 10.

Yoke members 30 are fixed to the arms 19 by means of the rivets or bolts 31. A similar yoke member 32 is fixed to the upper side of the wall engaging member 23. Extended through the yokes 30 and the yoke 32 is the bar 33.

It will be seen that when the bar 33 is in position, that rotation of the wall engaging member 23 will be prevented, but longitudinal movement may be had.

In order to hold the wall engaging members 23 in position, while the arms 19 are installed, I have provided openings 34 in the ends of the wall engaging members 23, through which are driven nails or the like 35. The nails 35 are driven into the silo wall 10 and hold the wall engaging members 23 in position, while the device is being installed.

In the practical operation of my device, the center member 15 is suspended at any suitable point intermediate of the top of the bottom of the silo, and the arms 19 are then placed in position with one of their ends received within one of the sockets 16, the screw-threaded projection 29 being received within the opening 27 of the wall engaging member 23.

It will be seen that by rotation of the bolt 29, the wall engaging member 23 will be moved outwardly.

In Fig. 5 of the drawings, I have shown the silo wall, which is out of true, showing the wall 10 adjacent to the ends of the engaging member 23 slightly spaced therefrom.

By moving the engaging member 23 outwardly by means of the nut 29, it will be seen that the wall 10 will conform to the outline of the edge of the engaging member 23, and thus force the silo wall in position, until it will form a true circle.

It will be also understood that any number of the wall engaging members may be used. As illustrated in Fig. 2, five wall engaging members are shown there. The dotted lines show the side of the silo, which is out of true. In such cases, an extra wall engaging member is used for truing the silo.

The advantages of my device are that I am able to readily and easily install my truing device, and adjust any of the wall engaging members, so as to produce the result of truing the silo.

Another advantage is that I am able to use various lengths of arms 19, and thus use my device in silos of various diameters.

When it is desired to remove the truing device, after the silo has been filled, this can readily be accomplished by removing the bar 33, which will permit the remaining parts to be disassembled In addition to the foregoing objects and advantages of my silo truing device, it will be seen that the using of the truing device within the silo when it is empty, will prevent any of the staves from becoming loosened from their foundation.

Ordinarily as soon as some of the staves have become loosened from the foundation the silo becomes unsteady and begins to sag or tilt which is caused by the wind blowing against it.

The tilting or sagging of the silo soon causes the staves which are still firm on their foundation to become out of place, which results in a great many instances of the blowing down of the silo.

My device tends to reinforce against this objection and holds the silo erect on its foundation.

Some changes may be made in the arrangement and construction of the various parts of my device, without departing from the essential features and purposes of my invention, and it is my intention to cover by my claims, any modified forms of structure for use of mechanical equivalents, which may be reasonably included within their scope.

I claim as my invention:

1. A silo truing device comprising a center member having a plurality of sockets formed therein, a plurality of arms having one end selectively received in said sockets and adapted to extend radially from said center member, wall engaging members adapted to rest against the inner surface of the silo wall mounted on the free end of each of said arms, and means whereby said wall engaging members may be moved relative to said arms, said means including a screw-threaded member formed on the end of said arm and partially received in said wall engaging member, a nut on said screw-threaded member whereby the wall engaging member may be forced outwardly away from said arm, and means operatively connected to said arm and said wall engaging member for preventing twisting of the wall engaging member.

2. In combination with a silo, a truing device adapted to be placed therein intermediate of its top and bottom, comprising a center member having a plurality of sockets in its periphery, a plurality of arms extended radially from said center member and having one of their ends removably received in said sockets, wall engaging members adapted to co-act with a portion of the wall of the silo, the free end of said arms being provided with a hub member having a screw-threaded projection thereon, each of said wall engaging members being provided with an opening at a point midway between its ends, said opening being designed to slidably receive a portion of said screw-threaded projection, a member rotatably mounted on said screw-threaded projection adapted to engage the surface adjacent to said opening of the wall engaging members, the parts being so arranged that rotation of the member on the screw-threaded projection will cause the wall engaging member to be moved relative to the arm for causing the silo wall to be moved for the purposes stated.

Des Moines, Iowa, September 8, 1920.

JOSEPH A. DREW.